United States Patent
Nakaya et al.

[11] Patent Number: 6,134,348
[45] Date of Patent: Oct. 17, 2000

[54] IMAGE PROCESSING APPARATUS AND METHOD

[75] Inventors: Hideo Nakaya; Tetsujiro Kondo, both of Kanagawa, Japan

[73] Assignee: Sony Corporation, Tokyo, Japan

[21] Appl. No.: 08/943,373

[22] Filed: Oct. 3, 1997

[30] Foreign Application Priority Data

Oct. 4, 1996 [JP] Japan .................................. 8-264217

[51] Int. Cl.[7] .............................. G06K 9/36; G06K 9/62; H04N 7/12; H04N 1/41
[52] U.S. Cl. .......................... 382/224; 382/232; 382/235; 382/238; 382/243; 382/249; 348/405; 348/416; 358/426
[58] Field of Search .................................... 382/132, 224, 382/228, 235, 238, 243, 249, 232; 348/405, 571, 416; 358/426

[56] References Cited

U.S. PATENT DOCUMENTS

| | | | |
|---|---|---|---|
| 5,311,308 | 5/1994 | Bernard ..................... | 348/426 |
| 5,485,554 | 1/1996 | Lowitz et al. ............. | 358/1.17 |
| 5,555,322 | 9/1996 | Terai et al. ................ | 382/235 |
| 5,654,761 | 8/1997 | Jung .......................... | 348/416 |
| 5,671,294 | 9/1997 | Rogers et al. ............. | 382/228 |
| 5,701,369 | 12/1997 | Moon et al. .............. | 382/235 |
| 5,754,676 | 5/1998 | Komiya et al. ........... | 383/132 |
| 5,764,305 | 6/1998 | Kondo ...................... | 348/571 |
| 5,781,238 | 7/1998 | Kondo et al. ............. | 348/405 |
| 5,787,201 | 7/1998 | Nelson et al. ............ | 382/224 |
| 5,862,263 | 1/1999 | Kim et al. ................ | 358/426 |
| 5,892,847 | 4/1999 | Johnson .................... | 382/232 |

OTHER PUBLICATIONS

Kiselyov, et al "Self–Similarity of the Multiresolutional Image/Video Decomposition: Smart Expansion as Compression of Still and Moving Pictures", IEEE, Apr. 1994.

Liu, et al "Fractal Description and Classification of Breast Tumors", IEEE, Apr. 1991.

Chen, et al "Fractal Feature Analysis and Classificsation in Medical Imaging", IEEE, Feb. 1989.

*Primary Examiner*—Phuoc Tran
*Assistant Examiner*—Daniel G. Mariam
*Attorney, Agent, or Firm*—Frommer Lawrence & Haug, LLP.; William S. Frommer

[57] ABSTRACT

A block including a subject pixel is formed from an original image. A first class information generation circuit calculates similarity between a decimated block that is obtained by decimating pixels constituting the block and a reduced block obtained by reducing the block (self-similarity of an image). On the other hand, a second class information generation circuit detects a pattern of pixel values of pixels that are arranged in a direction with highest self-similarity in the reduced block (or the decimated block). A final class determination circuit determines a class of the block including the subject pixel based on outputs of both of the first class information generation circuit and the second class information generation circuit. A process corresponding to the thus-determined class is executed.

17 Claims, 13 Drawing Sheets

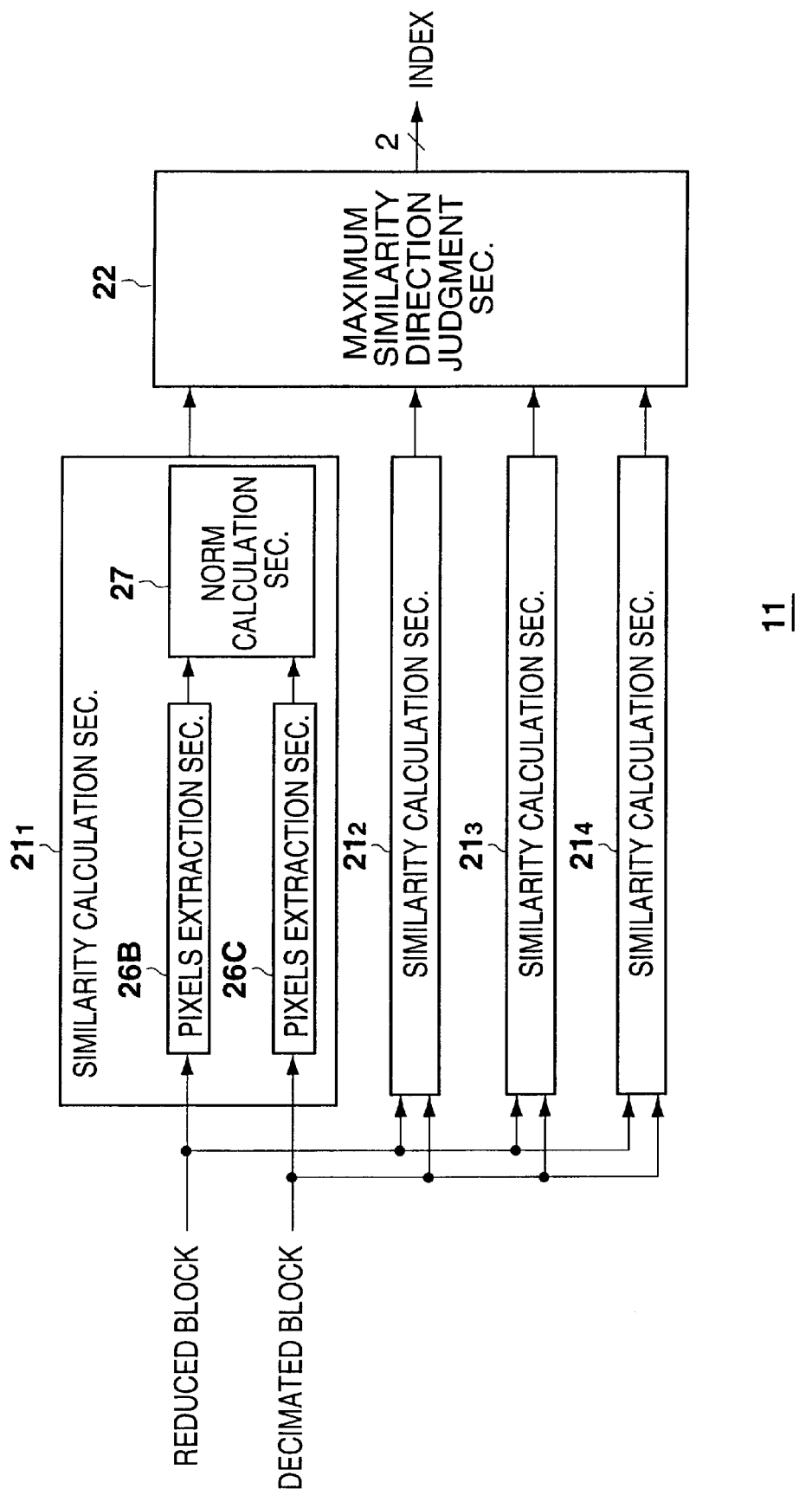

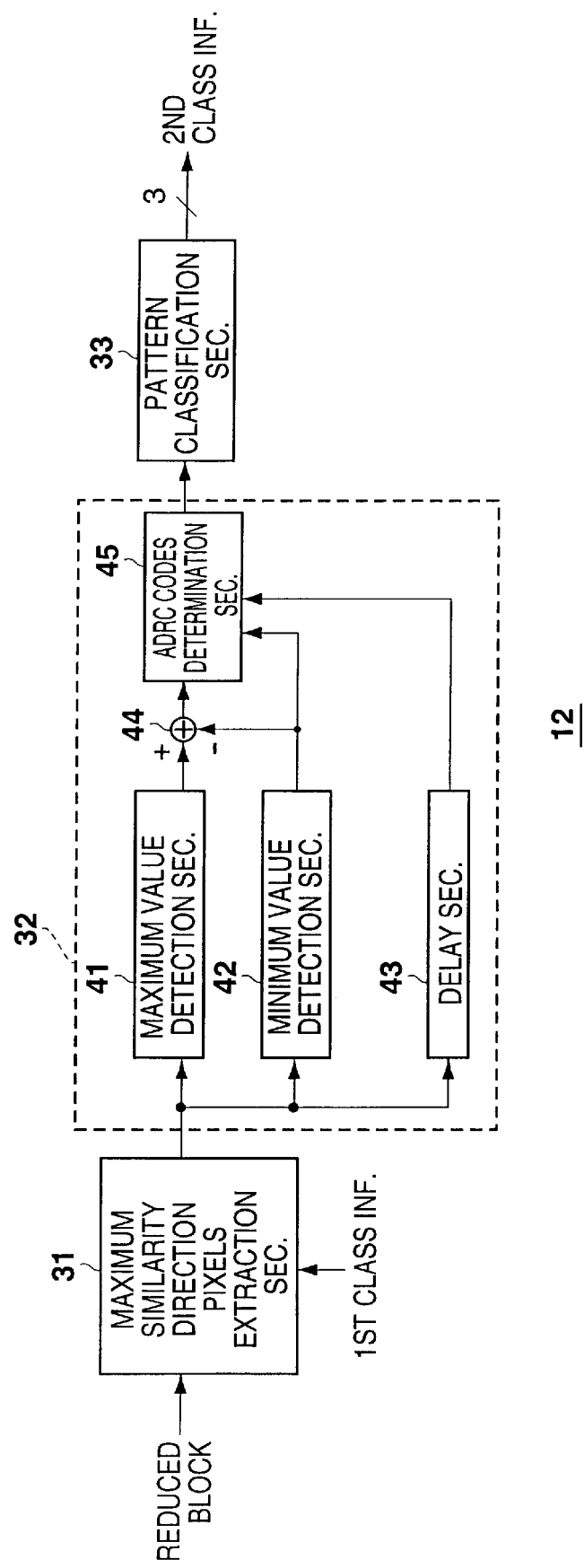

IMAGE PROCESSING APPARATUS AND METHOD

BACKGROUND OF THE INVENTION

The present invention relates to an image processing apparatus and method and, in particular, to an image processing apparatus and method which classify an image as one of several classes in accordance with its property and subject it to a process corresponding to its class.

For example, among various methods for performing image processing such as converting a standard or low resolution image (hereinafter referred to as an SD image where appropriate) into a high resolution image (hereinafter referred to as an HD image where appropriate) is a method which classifies each block that constitutes an SD image as one of predetermined classes in accordance with its property and subjects it to image processing corresponding to its class.

For example, it is now assumed that, as shown in FIG. 1A, a block of 2×2 pixels is formed by a certain subject pixel and three pixels adjacent to it and each pixel is expressed by one bit (that is, it has a level of 0 or 1). In this case, as shown in FIG. 1B, blocks of 4 (2×2) pixels can be classified into 16 ($=(2^1)^4$) patterns based on the distribution of the levels of the respective pixels. The classification means this type of division into patterns, and the classification enables each block to be subjected to image processing suitable for its class, i.e., its image property.

However, image properties (features) are not represented by only the level distribution of pixels. It would therefore be considered that an image may be processed more properly by classifying it by using some other feature quantity.

SUMMARY OF THE INVENTION

The present invention has been made in view of the above circumstances, and an object of the invention is therefore to make it possible to process an image more properly in accordance with its properties.

An image processing apparatus according to the invention is characterized by calculating means for calculating self-similarity of an image based on a compressed image, and classifying means for determining a class of the image from among a plurality of classes based on the calculated self-similarity.

An image processing method according to the invention is characterized by the steps of calculating self-similarity of an image based on a compressed image, and determining a class of the image from among a plurality of classes based on the calculated self-similarity.

More specifically, the invention is summarized as follows by using, in parentheses, exemplary terms appearing in the embodiments.

An image processing apparatus for classifying an image into a plurality of classes in accordance with a property thereof and for executing processes corresponding to the respective classes, comprising generating means (a decimation circuit 2 and a reduction circuit 3 in FIG. 2) for generating, from the image, a compressed image having a smaller number of pixels than the image; calculating means (similarity calculation sections $21_1$–$21_4$ in FIG. 5) for calculating self-similarity of the image based on the compressed image; classifying means (a maximum similarity direction judgment section 22 in FIG. 5 and a pattern classification section 33 in FIG. 6) for determining a class of the image from among the plurality of classes based on the calculated self-similarity; and processing means (a prediction circuit 6 in FIG. 2) for executing a process corresponding to the determined class on the image.

The above image processing apparatus may be constructed such that the generating means generates, as the compressed image, a decimated image obtained by decimating pixels of the image and a reduced image obtained by eliminating peripheral pixels of the image, and that the calculating means comprises first extracting means (a pixels extraction section 26C in FIG. 5) for extracting pixels that constitute the decimated image and arranged in a given direction; second extracting means (a pixels extraction section 26B in FIG. 5) for extracting pixels that constitute the reduced image and arranged in the given direction; and operating means (a norm calculation section 27 in FIG. 5) for calculating, as the self-similarity in the given direction, a norm of vectors having, as components, pixel values of the pixels extracted by the first and second extracting means, respectively.

The above image processing apparatus may further comprise detecting means (a maximum similarity direction pixels extraction section 31 in FIG. 6) for detecting a pattern of pixel values of pixels arranged in a direction in which the self-similarity calculated by the calculating means is highest, and the classifying means may classify the image as a class corresponding to the detected pattern.

Naturally, the above specific circuits and sections cited in parentheses are mere examples and should not be construed as limiting the corresponding means.

BRIEF DESCRIPTION OF THE DRAWINGS

FIG. 5 is a block diagram showing an exemplary configuration of a first class information generation circuit 11 shown in FIG. 4;

FIG. 6 is a block diagram showing an exemplary configuration of a second class information generation circuit 12 shown in FIG. 4;

DETAILED DESCRIPTION OF THE PREFERRED EMBODIMENTS

Figure 1A:
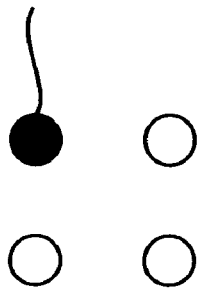
FIGS. 1A and 1B illustrate classification that is performed only based on patterns of pixel value levels.
Figure 1B:
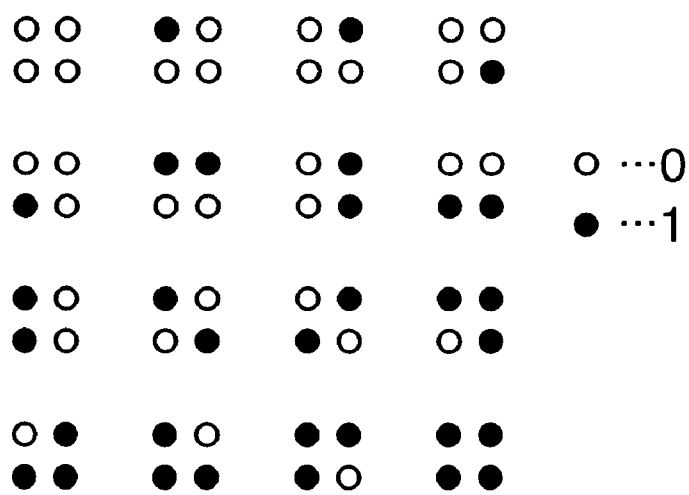
Figure 2:
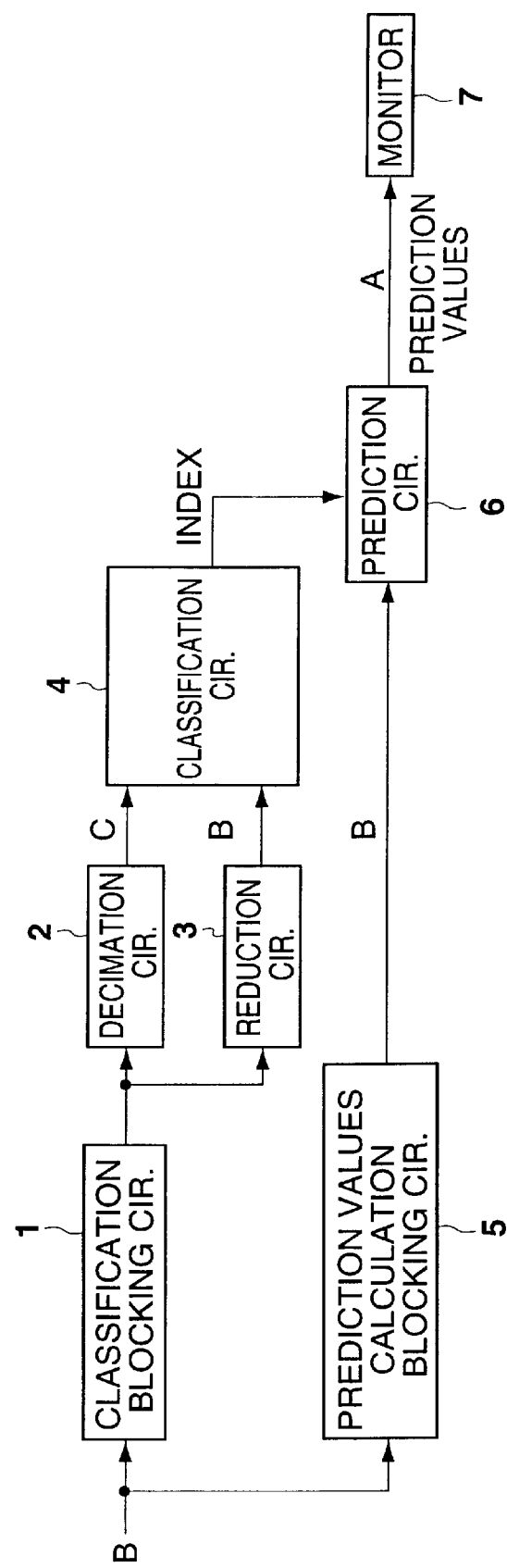
FIG. 2 is a block diagram showing a configuration of an image conversion apparatus according to an embodiment of the present invention.

FIG. 2 shows a configuration of an image conversion apparatus according to an embodiment of the present invention, which converts an SD image into an HD image. For example, with an assumption that in FIG. 3 pixels constituting an HD image (hereinafter referred to as HD pixels where appropriate) are represented by mark "•" and pixels constituting an SD image (hereinafter referred to as SD pixels where appropriate) are represented by mark "○," the image conversion apparatus of FIG. 2 converts the SD image shown by mark "○" in FIG. 3 into the HD image shown by mark "•" in the same figure.

For example, an image signal of an SD image that is transmitted via a transmission path such as a ground line, a satellite channel, or a CATV (cable television) network, or reproduced from a recording medium such as an optical disc, a magneto-optical disc, or a magnetic tape is supplied to a classification blocking circuit 1 and a prediction value calculation blocking circuit 5.

The classification blocking circuit 1 forms a classification block including a subject block from received SD pixels. For example, the classification blocking circuit 1 forms a classification block of 5×5 (horizontal/vertical) SD pixels having a subject pixel at the center as enclosed by a solid line in FIG. 3.

Five by five SD pixels (indicated by mark "○" in FIG. 3) that constitute a classification block are expressed as follows, where appropriate. An SD pixel that is an ith pixel from the left end and a jth pixel from the top in a classification block is expressed by $B_{ij}$. Therefore, in the example of FIG. 3, the classification block has an SD pixel $B_{33}$ as the subject pixel. Each of HD pixels (indicated by mark "•" in FIG. 3) generated from SD pixels that constitute a classification block are similarly expressed by $A_{ij}$.

The classification blocking circuit 1 outputs a generated classification block to a decimation circuit 2 and a reduction circuit 3.

When receiving a classification block, the decimation circuit 2 decreases the number of pixels belonging to the block by, for instance, decimating the SD pixels of the classification block, to form a decimated block. Specifically, the decimation circuit 2 forms a decimated block (compressed image) by decimating the classification block into ½ both in the horizontal and vertical directions, for instance. The decimated block is supplied to a classification circuit 4.

Pixels (indicated by broken-line circles in FIG. 3) that remain in a classification block after the decimation by the decimation circuit 2, that is, pixels constituting a decimated block, are called decimated SD pixels, where appropriate. Each of the decimated SD pixels is expressed by $C_{ij}$ in a similar manner to the manners of SD pixels and HD pixels.

On the other hand, the reduction circuit 3 forms a reduced block by reducing the classification block with the subject pixel as the center. Specifically, the reduction circuit 3 eliminate peripheral pixels from the classification block of 5×5 pixels, to form a reduced block (compressed image) of 3×3 pixels, for instance, having the subject pixel $B_{33}$ at the center. As in the case of the decimated block, the reduced block is supplied to the classification circuit 4.

Each of the decimated block and the reduced block can be said to be a compressed image, because it is generated by decreasing the number of pixels included in the classification block and a decrease in the number of pixels means a reduction in information quantity.

When receiving a decimated block and a reduced block, the classification circuit 4 performs classification by using those two kinds of blocks and supplies an index that indicates a class thus obtained to a prediction circuit 6. The index corresponds to the class of a prediction values calculation block to be output from the prediction values calculation blocking circuit 5.

The prediction circuit 6 is supplied with a prediction values calculation block from the prediction values calculation blocking circuit 5. That is, the prediction values calculation blocking circuit 5 forms a prediction values calculation block of 3×3 pixels, for instance, having the subject pixel $B_{33}$ at the center that is enclosed by a broken-line rectangle in FIG. 3, and supplies it to the prediction circuit 6.

Therefore, in this embodiment, the prediction values calculation block and the reduced block are constituted of the same SD pixels. But they need not always be constituted of the same SD pixels. That is, the reduced block may be any block as long as it is obtained by reducing the classification block with the subject pixel as the center, as described above. The prediction values calculation block may be formed so that its feature is included in the classification block. (Correctly, the prediction values calculation block may be formed in any way and the classification block needs to be formed so as to include a feature of the prediction values calculation block.)

When receiving a prediction values calculation block and an index corresponding to its class, the prediction circuit 6 executes an adaptive process for calculating prediction values of pixel values of HD pixels by linearly combining pixel values of SD pixels that constitute the prediction values calculation block and prediction coefficients as described below that correspond to the received index. Specifically, the prediction circuit 6 calculates, for instance, prediction values of 3×3 HD pixels $A_{43}, A_{44}, A_{45}, A_{53}, A_{54}, A_{55}, A_{63}, A_{64}$, and $A_{65}$ that have the subject pixel $B_{33}$ at the center based on prediction coefficients corresponding to the index and SD pixels $B_{22}, B_{23}, B_{24}, B_{32}, B_{33}, B_{34}, B_{42}, B_{43}$, and $B_{44}$ that constitute the prediction values calculation block.

The prediction circuit 6 calculates prediction values of all HD pixels that constitute an HD image by sequentially executing similar processes while SD pixels other than the pixel $B_{33}$ are employed as a subject pixel, and supplies the calculated prediction values to a monitor 7. Incorporating a D/A converter, for instance, the monitor 7 D/A-converts the pixel values (a digital signal) supplied from the prediction circuit 6 and displays an image obtained by the D/A conversion.

Figure 4:
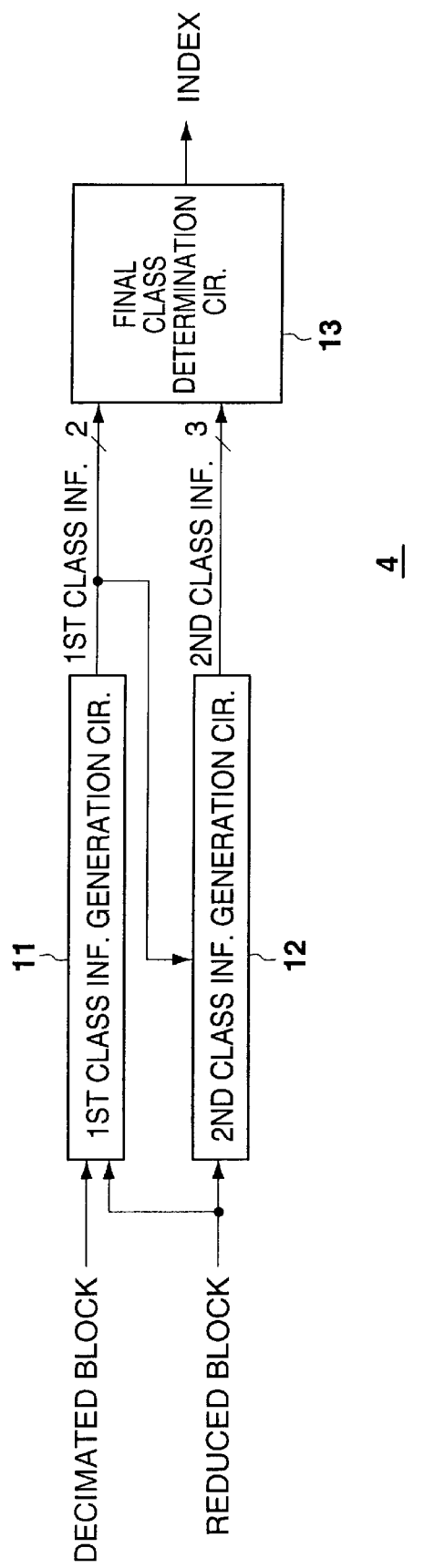
FIG. 4 is a block diagram showing an exemplary configuration of a classification circuit 4 shown in FIG. 2.

FIG. 4 shows an exemplary configuration of the classification circuit 4 shown in FIG. 2.

Figure 3:
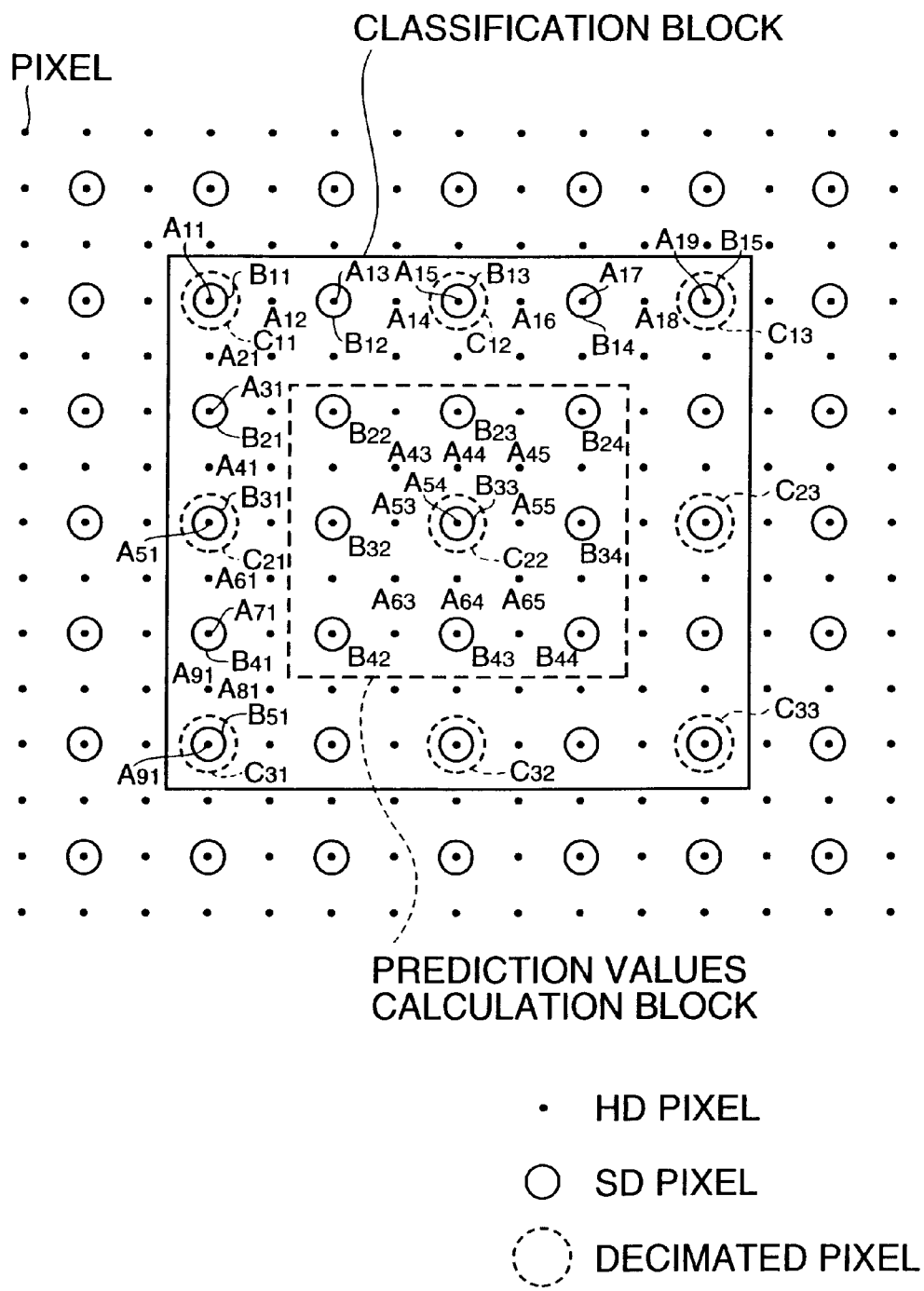
FIG. 3 illustrates processing of the image conversion apparatus of FIG. 2.

A decimated block coming from the decimation circuit 2 is supplied to a first class information generation circuit 11, and a reduced block (as described above, in this embodiment, this is the same as a prediction values calculation block as enclosed by the broken-line rectangle in FIG. 3) coming from the reduction circuit 3 is supplied to both of the first class information generation circuit 11 and a second class information generation circuit 12.

The first class information generation circuit 11 calculates (similarity between the reduced block and the decimated block) of the classification block based on the reduced block and the decimated block, and outputs, based on the calculated self-similarity, first class information to be used to classify the prediction values calculation block.

The first class information that has been produced based on the self-similarity is supplied to the second class information generation circuit 12 and a final class determination circuit 13.

Based on the first class information supplied from the first class information generation circuit 11, the second class information generation circuit 12 recognizes a direction having highest self-similarity. Further, the second class information generation circuit 12 detects a pattern of pixel values arranged in the highest self-similarity direction, and outputs second class information corresponding to the detected pattern to the final class determination circuit 13. Based on the first class information and the second class information supplied from the first and second class information generation circuits 11 and 12, the final class determination circuit 13 classifies the prediction values calculation block and outputs an index corresponding to a determined class to the prediction circuit 6 (see FIG. 2).

FIG. 5 shows an exemplary configuration of the first class information generation circuit 11 shown in FIG. 4.

The decimated block and the reduced block are supplied to similarity calculation sections $21_1$–$21_4$. The similarity calculation section $21_1$ consists of pixels extraction sections 26B and 26C and a norm calculation section 27. The reduced block and the decimated block are supplied to the pixels extraction sections 26B and 26C, respectively.

The pixels extraction section 26B extracts part of the SD pixels $B_{22}$, $B_{23}$, $B_{24}$, $B_{32}$, $B_{33}$, $B_{34}$, $B_{42}$, $B_{43}$, and $B_{44}$ constituting the reduced block (see FIG. 3) which part are located on a given straight line passing through the subject pixel. For example, the pixels extraction section 26B extracts the SD pixels $B_{23}$, $B_{33}$, and $B_{43}$ on the vertical line passing through the subject pixel $B_{33}$. The extracted SD pixels $B_{23}$, $B_{33}$, and $B_{43}$ are output to the norm calculation section 27.

On the other hand, the pixels extraction section 26C extracts part of the SD pixels $C_{11}$, $C_{12}$, $C_{13}$, $C_{21}$, $C_{22}$, $C_{23}$, $C_{31}$, $C_{32}$, and $C_{33}$ constituting the decimated block (see FIG. 3) which part are located on the same straight line passing through the decimated pixel $C_{22}$ (subject pixel $B_{33}$) as in the case of the pixel extraction section 26B. In this example, the decimated pixels $C_{12}$, $C_{22}$, and $C_{32}$ are extracted by the pixels extraction section 26C. The extracted decimated SD pixels $C_{12}$, $C_{22}$, and $C_{32}$ are also output to the norm calculation section 27.

The norm calculation section 27 calculates the norm of vectors whose components are output pixel values of the pixels extraction sections 26B and 26C, respectively, and outputs a calculation result as self-similarity in the vertical direction to a maximum similarity direction judgment section 22.

Each of the similarity calculation sections $21_2$–$21_4$ calculates the norm of vectors by using pixels located on a straight line passing through the subject pixel in a different direction in the same manner as in the similarity calculation section $21_1$, and outputs the calculated norm as self-similarity in that direction to the maximum similarity direction judgment section 22. For example, the similarity calculation sections $21_2$–$21_4$ calculate self-similarity in the horizontal direction, the top-left to bottom-right direction, and the top-right to bottom-left direction, respectively, and outputs calculation results to the maximum similarity judgment section 22.

The maximum similarity judgment section 22 judges a highest similarity direction based on the outputs of the self-similarity calculation sections $21_1$–$21_4$. In this example, since the self-similarity is given by the norm of vectors, the maximum similarity judgment section 22 detects the smallest norm and judges the direction with the smallest norm to be a highest self-similarity direction. Obtaining the highest self-similarity direction, the maximum similarity judgment section 22 outputs, for instance, a 2-bit code corresponding to that direction as first class information. For example, the maximum similarity judgment section 22 outputs "00," "01," "10," and "11" as first class information when the highest self-similarity direction is the horizontal direction, the vertical direction, the top-left to bottom-right direction, and the top-right to bottom-left direction, respectively.

Although in the above example the norm of vectors whose components are pixel values is employed as the evaluation quantity of self-similarity in each direction, other parameters may be used as the evaluation quantity of self-similarity (hereinafter also referred to simply as similarity where appropriate).

For example, pixel values of the decimated SD pixels $C_{11}$, $C_{12}$, $C_{13}$, $C_{21}$, $C_{23}$, $C_{31}$, $C_{32}$, and $C_{33}$ that do not exist in the reduced block are calculated by extrapolation from pixel values of the SD pixels $B_{22}$, $B_{23}$, $B_{24}$, $B_{32}$, $B_{33}$, $B_{34}$, $B_{42}$, $B_{43}$, and $B_{44}$ that constitute the reduced block, and errors between the extrapolated results and pixel values of the true decimated SD pixels $C_{11}$, $C_{12}$, $C_{13}$, $C_{21}$, $C_{23}$, $C_{31}$, $C_{32}$, and $C_{33}$ are calculated. An error in each direction is employed as the evaluation quantity of similarity, and a direction with the smallest error may be judged to be a highest similarity direction.

In a further example, pixel values of the reduced block SD pixels $B_{22}$, $B_{23}$, $B_{24}$, $B_{32}$, $B_{34}$, $B_{42}$, $B_{43}$, and $B_{44}$ that do not exist at the positions of the decimated SD pixels $C_{11}$, $C_{12}$, $C_{13}$, $C_{21}$, $C_{22}$, $C_{23}$, $C_{31}$, $C_{32}$, and $C_{33}$ that constitute the decimated block (see FIG. 3) are calculated by interpolation from pixel values of the SD pixels $C_{11}$, $C_{12}$, $C_{13}$, $C_{21}$, $C_{22}$, $C_{23}$, $C_{31}$, $C_{32}$, and $C_{33}$, and errors between the interpolated results and pixel values of the true SD pixels $B_{22}$, $B_{23}$, $B_{24}$, $B_{32}$, $B_{34}$, $B_{42}$, $B_{43}$, and $B_{44}$ are calculated. An error in each direction is employed as the evaluation quantity of similarity, and a direction with the smallest error may be judged to be a highest similarity direction.

FIG. 6 shows an exemplary configuration of the second class information generation circuit 12 shown in FIG. 4.

The reduced block and the first class information are supplied to maximum similarity direction pixels extraction section 31 from the reduction circuit 3 and the first class information generation circuit 11, respectively. The maximum similarity direction pixels extraction section 31 recognizes the highest similarity direction based on the first class information, and extracts the SD pixels (hereinafter referred to as maximum similarity pixels where appropriate; in this embodiment, three of the reduced block SD pixels $B_{22}$, $B_{23}$, $B_{24}$, $B_{32}$, $B_{33}$, $B_{34}$, $B_{42}$, $B_{43}$, and $B_{44}$ that are arranged on a straight line passing through the subject pixel $B_{33}$ in one of the horizontal direction, the vertical direction, the top-left to bottom-right direction, and the top-right to bottom-left direction). The three maximum similarity pixels are supplied to a pattern classification section 33 via an ADRC processing section 32. The pattern classification section 33 detects a pattern of the maximum similarity pixels and outputs second class information corresponding to the detected pattern.

Usually, about 8 bits, for instance, are assigned to each pixel to express its pixel value. In this embodiment, as described above, three pixels are obtained as the maximum similarity pixels. Therefore, if the pixel values pattern classification were performed on three pixels each expressed by 8 bits, there would occur an extremely large number $(2^8)^3$ of patterns, in which case the number of classes becomes also enormous and a process for such a large number of classes becomes unduly complex.

In view of the above, in this embodiment, the ADRC processing section 32 performs ADRC (adaptive dynamic range coding) on the three maximum similarity pixels, whereby the number of bits of the maximum similarity pixels is decreased and hence the number of pixel value patterns is decreased.

Figure 7A:
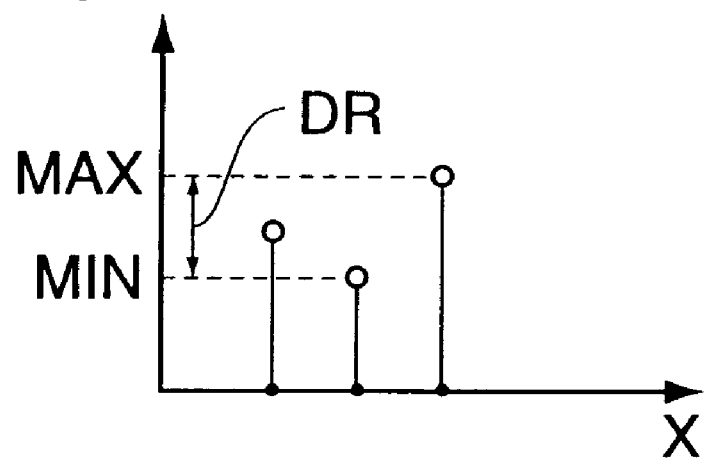
FIGS. 7A and 7B illustrate ADRC.

The ADRC is performed in the following manner. As shown in FIG. 7A, the maximum value MAX and the minimum value MIN are detected from the pixel values of the maximum similarity pixels arranged on a certain straight line. Then, a local dynamic range DR of the maximum similarity pixels is calculated as DR=MAX−MIN, and the pixel values of the three maximum similarity pixels are each requantized into K bits.

Figure 7B:
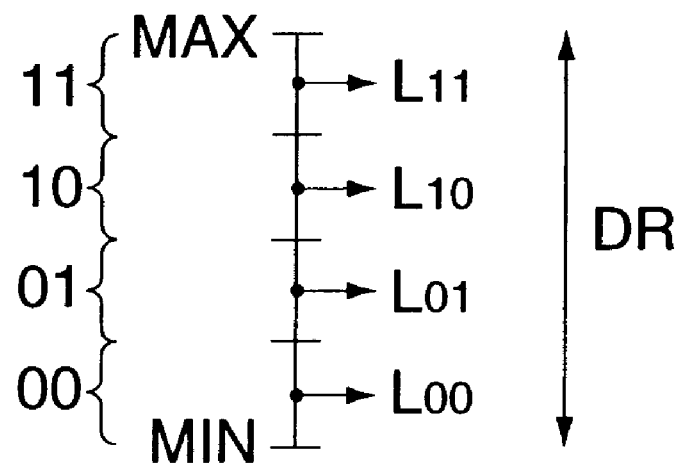

Specifically, the minimum value MIN is subtracted from the respective pixel values of the three maximum similarity pixels and resulting differences are divided by $DR/2^K$. Thus, the respective pixel values are converted into codes (ADRC codes) corresponding to resulting quotients. For example, if K=2, it is judged to which of ranges that are obtained by dividing the dynamic range DR into 4 (=$2^2$) equal parts each quotient belongs, as shown in FIG. 7B. The quotient is converted into, for instance, 2-bit codes of 00B, 01B, 10B, and 11B (symbol B means that each code is a binary number) when it belongs to the lowest range, the second lowest range, the second highest range, and the highest range, respectively.

In restoring pixel values by decoding, the ADRC codes 00B, 01B, 10B, and 11B are first converted into a center value $L_{00}$ of the lowest range, a center value $L_{01}$, of the second lowest range, a center value $L_{10}$ of the second highest range, and a center value $L_{11}$ of the highest range, respectively, and then the minimum value MIN is added to the respective center values.

Details of the above ADRC are disclosed in, for instance, Japanese Unexamined Patent Publication No. Hei. 3-53778 filed by the present assignee.

As described above, the number of patterns can be decreased by the ADRC in which the pixel values of the SD pixels are requantized by using the number of bits smaller than that assigned to the SD pixels. This type of ADRC is performed in the ADRC processing section 32.

That is, the three maximum similarity pixels that are output from the maximum similarity pixels extraction section 31 are supplied to a maximum value detection section 41, a minimum value detection section 42, and a delay section 43 of the ADRC processing section 32. The maximum value detection section 41 and the minimum value detection section 42 the maximum value MAX and the minimum value MIN, respectively, from the pixel values of the three maximum similarity pixels, and supply the detected values MAX and MIN to an operation element 44. The operation element 44 calculates a difference between the maximum value MAX and the minimum value MIN, i.e., a dynamic range DR(=MAX−MIN), and supplies it to an ADRC codes determination section 45. The minimum value MIN that is output from the minimum value determination section 42 is also supplied to the ADRC codes determination section 45.

On the other hand, the delay section 43 supplies the maximum similarity pixels to the ADRC codes determination section 45 after delaying those by a time that is required by the processes of the maximum value detection section 41 (or the minimum value detection section 42) and the operation element 45. In the ADRC codes determination section 45, the minimum value MIN is subtracted from the respective pixel values of the three maximum similarity pixels and resulting differences are requantized into 1-bit values, for instance, based on the dynamic range DR. The resulting 1-bit ADRC codes of the three maximum similarity pixels, i.e., the ADRC codes of 3 bits in total are output as second class information.

Figure 8:
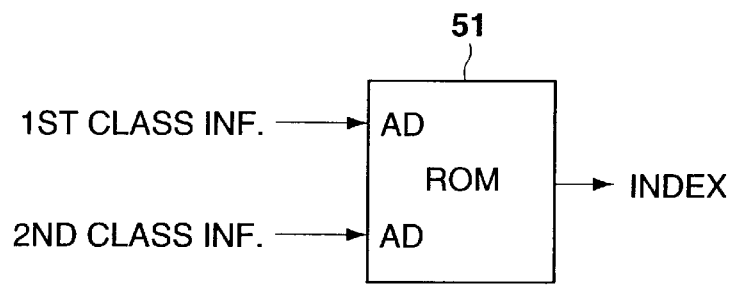
FIG. 8 is a block diagram showing an exemplary configuration of a final class determination circuit 13 shown in FIG. 4.

FIG. 8 is a block diagram showing an exemplary configuration of the final class determination circuit 13 shown in FIG. 4.

The first class information and the second class information are supplied to address terminals AD of a ROM 51. For example, the ROM 51 stores a value having the first class information as high-order bits and the second class information as low-order bits at an address that is designated by both of the first and second class information. When receiving the first and second class information at the address terminals AD, the ROM 51 reads out a stored value at the address that is designated by both of the first and second class information, and outputs it as an index indicating a class of the prediction values calculation block. In this embodiment, 5-bit data in which the 3-bit second class information is attached after the 2-bit first class information is output as the index.

Since as described above the classification is performed based on not only the pattern of pixel value levels but also the self-similarity of an image, the image can be processed more properly in accordance with its properties.

It is also possible to form the index by 6 bits in total by adding, to the above-described 5 bits, one bit that indicates whether the unit of processing is a frame or a field.

Further, the number of bits of the index can be decreased by storing the same index value in the ROM 51 at several different addresses. That is, based on the 2-bit first class information and the 3-bit second class information (5 bits in total), 32 (=$2^5$) kinds of classes occur. However, there are cases that there will occur no problem even if the prediction circuit 6 calculates prediction values of pixel values by using the same prediction coefficients. Therefore, the classes that enable use of the same prediction coefficients are handled as a single class, whereby the number of classes can be decreased.

Although in this embodiment the pattern classification is performed in the pattern classification section 33 (see FIG. 6) based on the ADRC codes, the pattern classification may be performed on other data that has been subjected to such processing as DPCM (predictive coding), BTC (block truncation coding), VQ (vector quantization), DCT (discrete cosine transform), or Hadamard transform.

Figure 9:
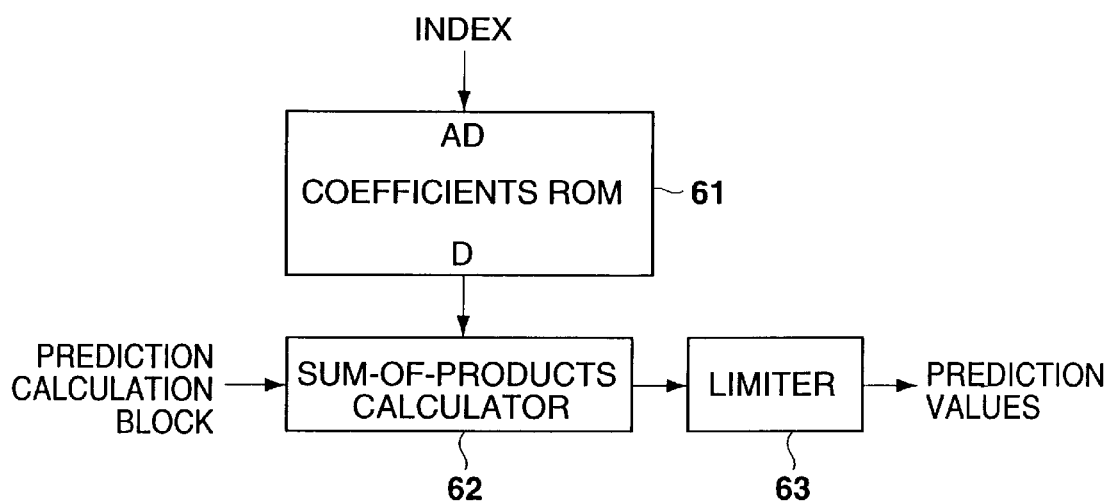
FIG. 9 is a block diagram showing a prediction circuit 6 shown in FIG. 6.

FIG. 9 shows an exemplary configuration of the prediction circuit 6 shown in FIG. 2.

Prediction coefficients for each class that is determined in the above-described manner are stored in advance in a coefficients ROM (read only memory) 61 through learning. When receiving an index that is output from the prediction circuit 4, the coefficients ROM 61 outputs, to a sum-of-products calculator 62, prediction coefficients that are stored at an address corresponding to the received index, i.e., prediction coefficients corresponding to the class of a prediction values calculation block that is output from the prediction values calculation blocking circuit 5.

The sum-of-products calculator 62 is supplied with, in addition to the prediction coefficients, a prediction values calculation block from the prediction values calculation blocking circuit 5. Based on the prediction values calculation block and the prediction coefficients corresponding to its class, executes an adaptive process for calculating prediction values of pixel values of HD pixels by calculating a linear first-order formula (1) (shown later; more specifically, formulae (8), for instance), i.e., sum-of-products operations. For example, prediction values of the 3×3 HD pixels $A_{43}$, $A_{44}, A_{45}, A_{53}, A_{54}, A_{55}, A_{63}, A_{64}$, and $A_{65}$ having the subject pixel $B_{33}$ at the center are calculated by calculating linear first-order combinations of the prediction coefficients and the SD pixels $B_{22}, B_{23}, B_{24}, B_{32}, B_{33}, B_{34}, B_{42}, B_{43}$, and $B_{44}$ that constitute the prediction values calculation block. The prediction values of the HD pixels calculated by the sum-of-products calculator 62 are supplied to a limiter 63, where the prediction values are limited so as not to exceed the dynamic range of a D/A converter that is incorporated in the monitor 7. Resulting prediction values are supplied to the monitor 7.

The adaptive process will be described below in detail.

For example, consider a case of calculating a prediction value E[y] of an HD pixel value y by using a linear first-order combination model that is defined by several SD pixel values (hereinafter referred to as learning data where appropriate) $x_1, x_2, \ldots$ and given prediction coefficients $w_1, w_2, \ldots$. In this case, the prediction value E[y] is expressed as $$E[y] = w_1 x_1 + w_2 x_2 + \ldots \quad (1)$$

Now, for generalization, a matrix W as a set of the prediction coefficients w, a matrix X as a set of the learning data x, and a matrix Y' as a set of the prediction values E[y] are defined as follows:

$$X = \begin{pmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{pmatrix}$$

$$W = \begin{pmatrix} w_1 \\ w_2 \\ \cdots \\ w_n \end{pmatrix}, \quad Y' = \begin{pmatrix} E[y_1] \\ E[y_2] \\ \cdots \\ E[y_m] \end{pmatrix}$$

Thus, the following observation equation is obtained:

$$XW = Y' \quad (2)$$

Now, it is intended to calculate prediction values E[y] that are close to HD pixel values y by applying the least square method to the observation equation. Defining a vector Y as a set of HD pixel values (hereinafter referred to as teacher data where appropriate) and a vector E as a set of residuals e of the prediction values E[y] with respect to the HD pixel values y as $$E = \begin{pmatrix} e_1 \\ e_2 \\ \cdots \\ e_m \end{pmatrix}, \quad Y = \begin{pmatrix} y_1 \\ y_2 \\ \cdots \\ y_m \end{pmatrix},$$

we obtain the following residual equation:

$$XW = Y + E \quad (3)$$

Prediction coefficients $w_i$ for obtaining prediction values E[y] close to the HD pixel values y can be determined by minimizing a sum of squared errors $$\sum_{i=1}^{m} e_i^2.$$

Therefore, when the sum of squared errors differentiated by the prediction coefficients $w_i$ becomes 0, that is, when the prediction coefficients $w_i$ satisfy the following equation, an optimum solution of prediction values E[y] close to the HD pixel values y should be obtained:

$$e_1 \frac{\partial e_1}{\partial w_i} + e_2 \frac{\partial e_2}{\partial w_i} + \ldots + e_m \frac{\partial e_m}{\partial w_i} = 0, \quad (i = 1, 2, \ldots, n) \quad (4)$$

First, by differentiating Equation (3) by the prediction coefficients $w_i$, we obtain $$\frac{\partial e_i}{\partial w_1} = x_{i1}, \quad \frac{\partial e_i}{\partial w_2} = x_{i2}, \ldots, \frac{\partial e_i}{\partial w_n} = x_{in}, \quad (i = 1, 2, \ldots, m). \quad (5)$$

From Equations (4) and (5), Equation (6) is obtained.

$$\sum_{i=1}^{m} e_i x_{i1} = 0, \sum_{i=1}^{m} e_i x_{i2} = 0, \ldots, \sum_{i=1}^{m} e_i x_{in} = 0 \quad (6)$$

Further, considering the relationship among the learning data x, the prediction coefficients w, and the teacher data y in Equation (3), we can obtain the following normal equations:

$$\begin{cases} \left(\sum_{i=1}^{m} x_{i1} x_{i1}\right) w_1 + \left(\sum_{i=1}^{m} x_{i1} x_{i2}\right) w_2 + \ldots + \left(\sum_{i=1}^{m} x_{i1} x_{in}\right) w_n = \sum_{i=1}^{m} x_{i1} y_i \\ \left(\sum_{i=1}^{m} x_{i2} x_{i1}\right) w_1 + \left(\sum_{i=1}^{m} x_{i2} x_{i2}\right) w_2 + \ldots + \left(\sum_{i=1}^{m} x_{i2} x_{in}\right) w_n = \sum_{i=1}^{m} x_{i2} y_i \\ \cdots \\ \left(\sum_{i=1}^{m} x_{in} x_{i1}\right) w_1 + \left(\sum_{i=1}^{m} x_{in} x_{i2}\right) w_2 + \ldots + \left(\sum_{i=1}^{m} x_{in} x_{in}\right) w_n = \sum_{i=1}^{m} x_{in} y_i \end{cases} \quad (7)$$

Since the normal equations (7) can be obtained in the same number as the number of prediction coefficients w to be determined, optimum prediction coefficients w can be determined by solving Equations (7). (For Equations (7) to be solvable, the matrix that is constituted of the coefficients of the prediction coefficients w needs to be regular.) Equation (7) can be solved by using a sweep-out method (Gauss-Jordan elimination method), for instance.

The adaptive process is a process for determining prediction values E[y] close to the HD pixel values y according to Equation (1) by using the optimum prediction coefficients w that have been determined in advance. The adaptive process is executed in the sum-of-products calculator 62.

The adaptive process is different from an interpolation process in that components that are not included in an SD image but included in an HD image are reproduced. Although Equation (1) itself appears the same as an equation of an interpolation process using an interpolation filter, the prediction coefficients w that correspond to tap coefficients of the interpolation filter are determined by, say, learning that uses the teacher data y, thereby allowing reproduction of components included in an HD image. Therefore, the adaptive process can be said to be a process having, so to speak, an image creating function.

The above-described adaptive process is executed by using the prediction coefficients $w_1, w_2, \ldots$ that are obtained through learning that uses HD pixel values y as teacher data. This type of adaptive process (hereinafter referred to as a first adaptive process where appropriate) is the one that was proposed by the present assignee.

According to the first adaptive process, an HD image is needed as teacher data to determine the prediction coefficients $w_1, w_2, \ldots$, i.e., in learning. For example, to determine prediction values of the HD pixels $A_{43}, A_{44}, A_{45}, A_{53}, A_{54}, A_{55}, A_{63}, A_{64}$, and $A_{65}$ from pixel values of the SD pixels $B_{22}, B_{23}, B_{24}, B_{32}, B_{33}, B_{34}, B_{42}, B_{43}$, and $B_{44}$ (see FIG. 3) by the first adaptive process, pixel values of the HD pixels $A_{43}, A_{44}, A_{45}, A_{53}, A_{54}, A_{55}, A_{63}, A_{64}$, and $A_{65}$ are needed for calculation of the prediction coefficients $w_1, w_2, \ldots$ It will be convenient if the prediction coefficients $w_1, w_2, \ldots$ can be determined without referring to an HD image.

It is possible to determine the prediction coefficients $w_1, w_2, \ldots$ only from SD pixels, for instance, in a manner described below by utilizing the self-similarity of an image and to execute an adaptive process (hereinafter referred to as a second adaptive process where appropriate) by using those prediction coefficients in the prediction circuit 6.

Referring to FIG. 3, if attention is paid to the positional relationship between the SD pixels $B_{22}, B_{23}, B24, B_{32}, B_{33}, B_{34}, B_{42}, B_{43}$, and $B_{44}$ that constitute the prediction values calculation block and the HD pixels $A_{43}, A_{44}, A_{45}, A_{53}, A_{54}, A_{55}, A_{63}, A_{64}$, and $A_{65}$, it is seen that this positional relationship is, say, similar to the positional relationship between the decimated SD pixels $C_{11}, C_{12}, C_{13}, C_{21}, C_{22}, C_{23}, C_{31}, C_{32}$, and $C_{33}$ and the SD pixels $B_{22}, B_{23}, B_{24}, B_{32}, B_{33}, B_{34}, B_{42}, B_{43}$, and $B_{44}$.

Therefore, based on the self-similarity of an image, it is possible to determine prediction coefficients $w_1, w_2, \ldots$ by performing learning in which the pixel values of the decimated SD pixels $C_{11}, C_{12}, C_{13}, C_{21}, C_{22}, C_{23}, C_{31}, C_{32}$, and $C_{33}$ are used as learning data and the pixel values of the SD pixels $B_{22}, B_{23}, B_{24}, B_{32}, B_{33}, B_{34}, B_{42}, B_{43}$, and $B_{44}$ are used as teacher data, and to use the thus-determined prediction coefficients $w_1, w_2, \ldots$ to obtain prediction values of the HD pixels $A_{43}, A_{44}, A_{45}, A_{53}, A_{54}, A_{55}, A_{63}, A_{64}$, and $A_{65}$ from the pixel values of the SD pixels $B_{22}, B_{23}, B_{24}, B_{32}, B_{33}, B_{34}, B_{42}, B_{43}$, and $B_{44}$ that constitute the prediction values calculation block.

Figure 10:
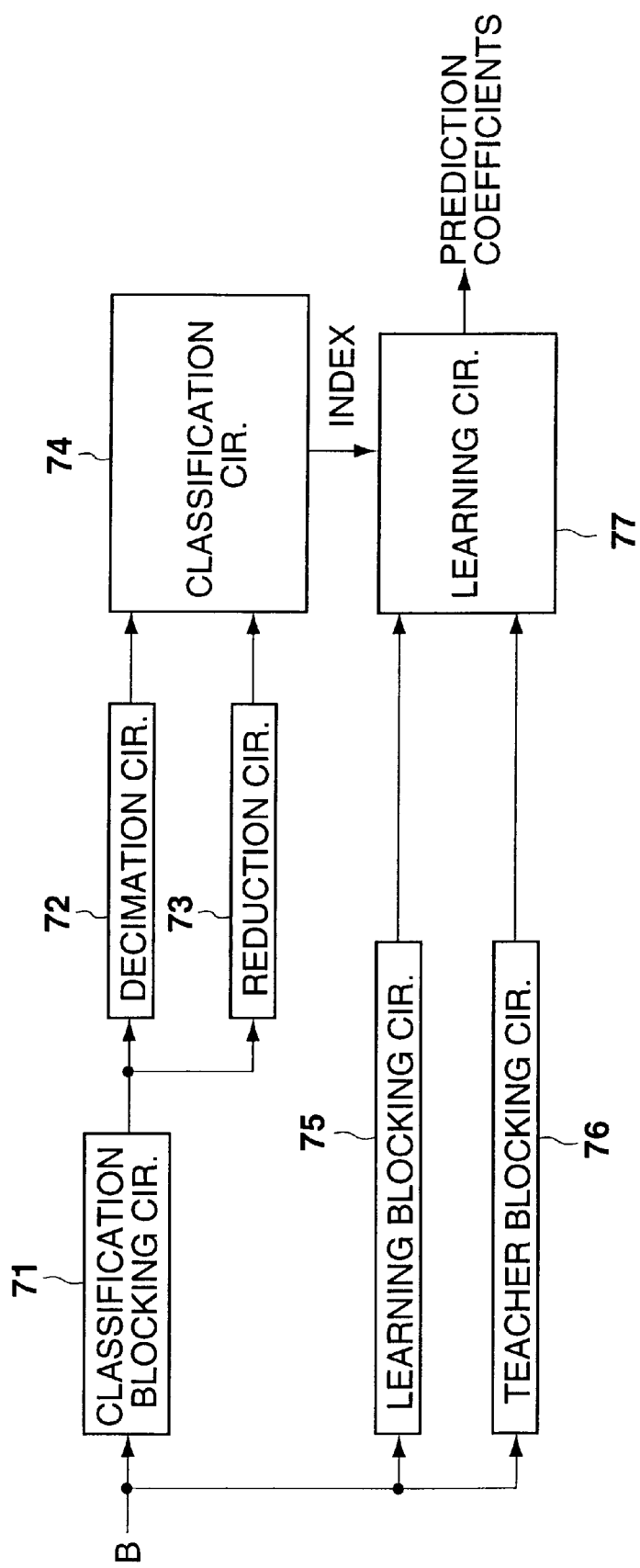
FIG. 10 is a block diagram showing an exemplary configuration of an image processing apparatus which performs learning to determine prediction coefficients.

FIG. 10 shows an exemplary configuration of an image processing apparatus which performs learning to determine prediction coefficients necessary for execution of the second adaptive process.

An SD image is supplied to a classification blocking circuit 71, a learning blocking circuit 75, and a teacher blocking circuit 76.

The classification blocking circuit 71, a decimation circuit 72, a reduction circuit 73, and a classification circuit 74 execute respective processes similar to those of the classification blocking circuit 1, the decimation circuit 2, the reduction circuit 3, and the classification circuit 4 shown in FIG. 2. As a result, an index corresponding to a class of a learning block that is output from the learning blocking circuit 75 (details of which will be described later) is supplied to a learning circuit 77.

On the other hand, in the manner as described above, the learning blocking circuit 75 forms, from the SD image, a block that is larger than the prediction values calculation block that is constituted of SD pixels as learning data (decimated SD pixels) of $C_{11}, C_{12}, C_{13}, C_{21}, C_{22}, C_{23}, C_{31}, C_{32}$, and $C_{33}$, and outputs the thus-formed block to the learning circuit 77 as a learning block. At the same time, the teacher blocking circuit 76 forms, from the SD image, a block that is constituted of SD pixels as teacher data of $B_{22}, B_{23}, B_{24}, B_{32}, B_{33}, B_{34}, B_{42}, B_{43}$, and $B_{44}$, and outputs the thus-formed block also to the learning circuit 77 as a teacher block.

The learning circuit 77 calculates prediction coefficients with minimum errors by, for instance, the least square method by using the learning block SD pixels as learning data and the teacher block SD pixels as teacher data.

For example, now let $x_1, x_2, x_3, \ldots$ represent pixel values of SD pixels (decimated SD pixels) constituting the learning block and $w_1, w_2, w_3, \ldots$ represent prediction coefficients to be determined; then, to calculate a pixel value y of a certain SD pixel that constitutes the teacher block as a linear first-order combination of the above two kinds of parameters, the prediction coefficients $w_1, w_2, w_3, \ldots$ need to satisfy $$y = w_1 x_1 + w_2 x_2 + w_3 x_3 + \ldots$$

Therefore, in the learning circuit 77, the prediction coefficients $w_1, w_2, w_3, \ldots$ that minimize a squared error of a prediction value $w_1 x_1 + w_2 x_2 + w_3 x_3 + \ldots$ for a true value y are determined from the learning block and teacher block by establishing and solving the normal equations (7).

The learning circuit 77 outputs prediction coefficients determined therein as prediction coefficients of a class corresponding to the index that is supplied from the classification circuit 74.

That is, in this embodiment, it is necessary to calculate prediction coefficients for determining the nine SD pixels $B_{22}, B_{23}, B_{24}, B_{32}, B_{33}, B_{34}, B_{42}, B_{43}$, and $B_{44}$ that constitute the teacher block from the SD pixels (decimated SD pixels) $C_{11}, C_{12}, C_{13}, C_{21}, C_{22}, C_{23}, C_{31}, C_{32}$, and $C_{33}$ that constitute the learning block.

To this end, in the learning circuit 77, a normal equation (7) is established for a class CL corresponding to the index that is output from the classification circuit 74 by using pixel values of the SD pixels $B_{22}, B_{23}, B_{24}, B_{32}, B_{33}, B_{34}, B_{42}, B_{43}$, and $B_{44}$ as teacher data and pixel values of the SD pixels (decimated SD pixels) $C_{11}, C_{12}, C_{13}, C_{21}, C_{22}, C_{23}, C_{31}, C_{32}$, and $C_{33}$ as learning data.

Similarly, the learning circuit 77 establishes normal equations for other learning blocks that are classified as the class CL. The learning circuit 77 repeatedly establishes normal equations until they count a number that enables calculation of prediction coefficients $w_1(B_{22})-w_9(B_{22})$, $w_1(B_{23})-w_9(B_{23})$, $w_1(B_{24})-w_9(B_{24})$, $w_1(B_{32})-w_9(B_{32})$, $w_1(B_{33})-w_9(B_{33})$, $w_1(B_{34})-w_9(B_{34})$, $w_1(B_{42})-w_9(B_{42})$, $w_1(B_{43})-w_9(B_{43})$, and $w_1(B_{44})-w_9(B_{44})$ (in this embodiment, nine prediction coefficients w are needed to calculate one prediction value because nine learning data are used) that are necessary for determination of prediction values $E[B_{22}]$, $E[B_{23}]$, $E[B_{24}]$, $E[B_{32}]$, $E[B_{33}]$, $E[B_{34}]$, $E[B_{42}]$, $E[B_{43}]$, and $E[B_{44}]$ of the respective SD pixels $B_{22}, B_{23}, B_{24}, B_{32}, B_{33}, B_{34}, B_{42}, B_{43}$, and $B_{44}$. Once the above number of normal equations are obtained, prediction coefficients $w_1(B_{3+m, 3+n})-w_9(B_{3+m, 3+n})$ that are most suitable for determination of prediction values $E[B_{3+m, 3+n}]$ of the SD pixels $B_{3+m, 3+n}$ (m=−1, 0, +1, and n=−1, 0, +1) are calculated for the class CL by solving the normal equations.

The thus-calculated prediction coefficients that are output from the learning circuit 77 can be stored in the coefficients ROM 61 (see FIG. 9) constituting the prediction circuit 6 (see FIG. 2). In this case, the sum-of-products calculator 62 calculates prediction values $E[A_{43}]$, $E[A_{44}]$, $E[A_{45}]$, $E[A_{53}]$, $E[A_{54}]$, $E[A_{55}]$, $E[A_{63}]$, $E[A_{64}]$, and $E[A_{65}]$ of the respective HD pixels $A_{43}$, $A_{44}$, $A_{45}$, $A_{53}$, $A_{54}$, $A_{55}$, $A_{63}$, $A_{64}$, and $A_{65}$ in the prediction values calculation block according to the following equations that correspond to Equation (1):

$$E[A_{43}]=w_1(B_{22})B_{22}+w_2(B_{22})B_{23}+w_3(B_{22})$$
$$B_{24}+w_4(B_{22})B_{32}+w_5(B_{22})B_{33}+w_6(B_{22})B_{34}+w_7(B_{22})B_{42}+w_8(B_{22})B_{43}+w_9(B_{22})B_{44}$$

$$E[A_{44}]=w_1(B_{23})B_{22}+w_2(B_{23})B_{23}+w_3(B_{23})$$
$$B_{24}+w_4(B_{23})B_{32}+w_5(B_{23})B_{33}+w_6(B_{23})B_{34}+w_7(B_{23})B_{42}+w_8(B_{23})B_{43}+w_9(B_{23})B_{44}$$

$$E[A_{45}]=w_1(B_{24})B_{22}+w_2(B_{24})B_{23}+w_3(B_{24})$$
$$B_{24}+w_4(B_{24})B_{32}+w_5(B_{24})B_{33}+w_6(B_{24})B_{34}+w_7(B_{24})B_{42}+w_8(B_{24})B_{43}+w_9(B_{24})B_{44}$$

$$E[A_{53}]=w_1(B_{32})B_{22}+w_2(B_{32})B_{23}+w_3(B_{32})$$
$$B_{24}+w_4(B_{32})B_{32}+w_5(B_{32})B_{33}+w_6(B_{32})B_{34}+w_7(B_{32})B_{42}+w_8(B_{32})B_{43}+w_9(B_{32})B_{44}$$

$$E[A_{54}]=w_1(B_{33})B_{22}+w_2(B_{33})B_{23}+w_3(B_{33})$$
$$B_{24}+w_4(B_{33})B_{32}+w_5(B_{33})B_{33}+w_6(B_{33})B_{34}+w_7(B_{33})B_{42}+w_8(B_{33})B_{43}+w_9(B_{33})B_{44}$$

$$E[A_{55}]=w_1(B_{34})B_{22}+w_2(B_{34})B_{23}+w_3(B_{34})$$
$$B_{24}+w_4(B_{34})B_{32}+w_5(B_{34})B_{33}+w_6(B_{34})B_{34}+w_7(B_{34})B_{42}+w_8(B_{34})B_{43}+w_9(B_{34})B_{44}$$

$$E[A_{63}]=w_1(B_{42})B_{22}+w_2(B_{42})B_{23}+w_3(B_{42})$$
$$B_{24}+w_4(B_{42})B_{32}+w_5(B_{42})B_{33}+w_6(B_{42})B_{34}+w_7(B_{42})B_{42}+w_8(B_{42})B_{43}+w_9(B_{42})B_{44}$$

$$E[A_{64}]=w_1(B_{43})B_{22}+w_2(B_{43})B_{23}+w_3(B_{43})$$
$$B_{24}+w_4(B_{43})B_{32}+w_5(B_{43})B_{33}+w_6(B_{43})B_{34}+w_7(B_{43})B_{42}+w_8(B_{43})B_{43}+w_9(B_{43})B_{44}$$

$$E[A_{65}]=w_1(B_{44})B_{22}+w_2(B_{44})B_{23}+w_3(B_{44})$$
$$B_{24}+w_4(B_{44})B_{32}+w_5(B_{44})B_{33}+w_6(B_{44})B_{34}+w_7(B_{44})B_{42}+w_8(B_{44})B_{43}+w_9(B_{44})B_{44} \quad (8)$$

As described above, the prediction coefficients are determined by performing learning so that the prediction coefficients of the respective SD pixels $B_{22}$, $B_{23}$, $B_{24}$, $B_{32}$, $B_{33}$, $B_{34}$, $B_{42}$, $B_{43}$, and $B_{44}$ from the given learning block (given block) that is constituted of the decimated SD pixels $C_{11}$, $C_{12}$, $C_{13}$, $C_{21}$, $C_{22}$, $C_{23}$, $C_{31}$, $C_{32}$, and $C_{33}$, and the adaptive process is executed on the prediction values calculation block (smaller block) that is smaller than the learning block and obtained by, say, reducing the learning block with the subject pixel $B_{33}$ as the center. According to this method, proper prediction values of the HD pixels $A_{43}$, $A_{44}$, $A_{45}$, $A_{53}$, $A_{54}$, $A_{55}$, $A_{63}$, $A_{64}$, and $A_{65}$ can be obtained based on the self-similarity of an image.

Figure 11:
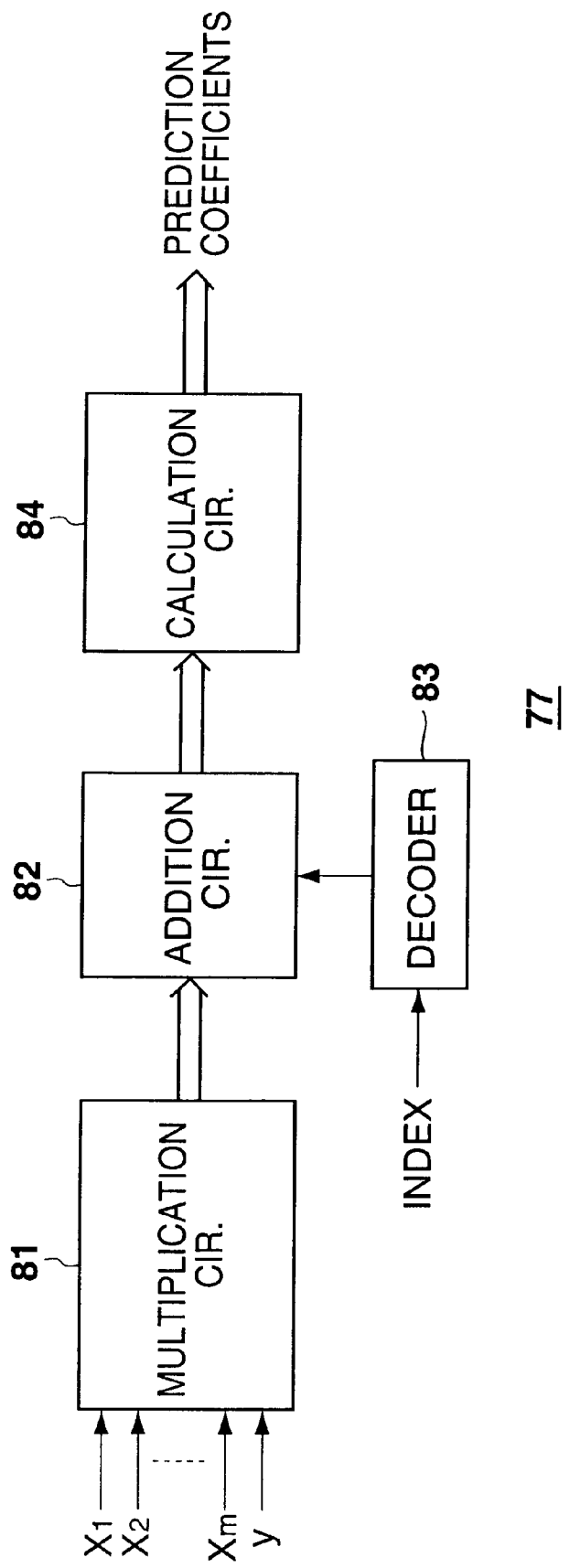
FIG. 11 is a block diagram showing an exemplary configuration of a learning circuit 77 shown in FIG. 10.

FIG. 11 shows an exemplary configuration of the learning circuit 77 shown in FIG. 10.

A multiplication circuit 81 receives learning data $x_1$, $x_2$, ..., $x_m$ that constitute the learning block and a teacher data y that constitute the teacher block. The multiplication circuit 81 calculates products between the learning data $x_1$, $x_2$, ..., $x_m$ as subjects of the summation portions ($\Sigma$) and products of the teacher data y and the respective learning data $x_1$, $x_2$, ..., $x_m$ in the normal equations (7), and supplies the calculated products to an addition circuit 82.

The addition circuit 82 is supplied with an output of a decoder 83 as well as the outputs of the multiplication circuit 81. Based on the index supplied from the classification circuit 74 (see FIG. 10), the decoder 83 recognizes a class of the learning data $x_1$, $x_2$, ..., $x_m$ (class of the learning block) and outputs a recognition result to the addition circuit 82.

Using the outputs of the multiplication circuit 81, the addition circuit 82 performs operations corresponding to the summation portions of the normal equations (7) independently for each class that is supplied from the decoder 83, and supplies calculation results to a calculation circuit 84. The calculation circuit 84 calculates and outputs prediction coefficients by performing an operation of a sweep-out method by using the outputs of the addition circuit 82.

Figure 12:
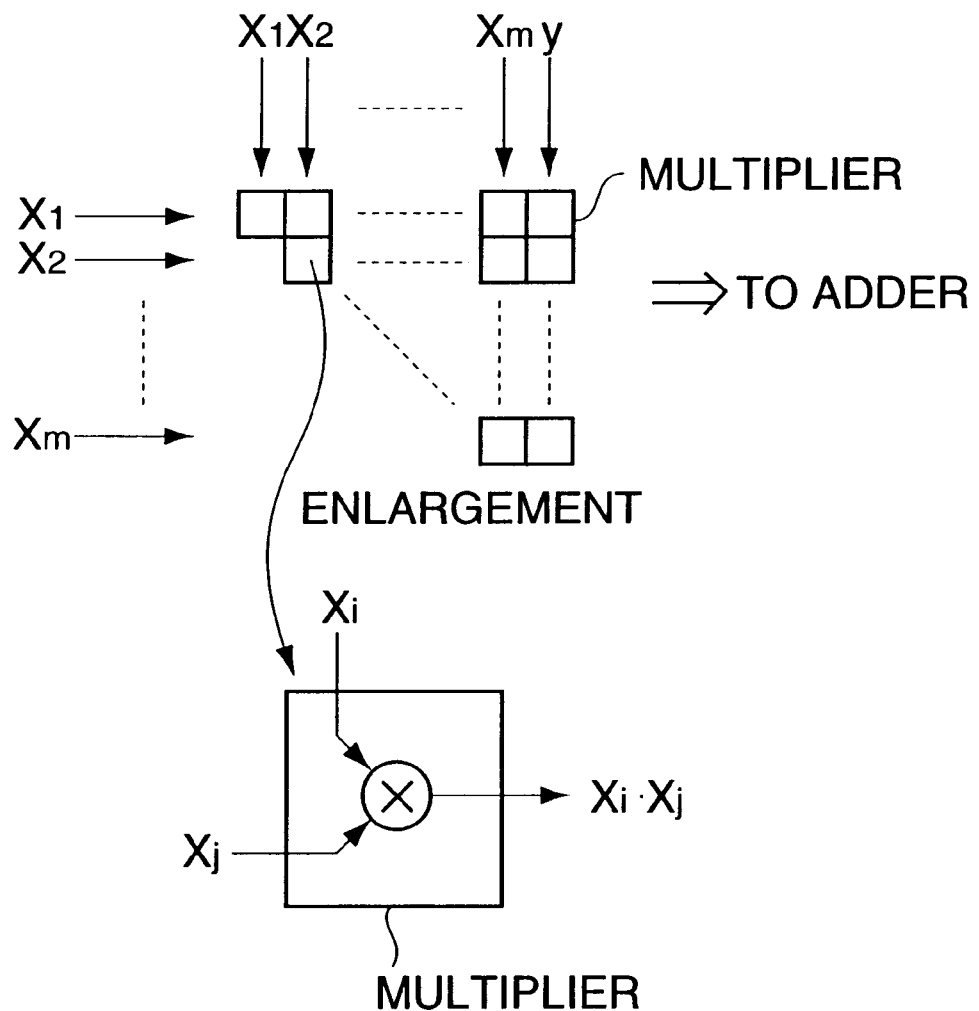
FIG. 12 is a block diagram showing an exemplary configuration of a multiplication circuit 81 shown in FIG. 11.

FIG. 12 shows an exemplary configuration of the multiplication circuit 81 shown in FIG. 11.

As shown in FIG. 12, the multiplication circuit 81 is a multiplier array in which multipliers are arranged in a predetermined form. That is, the multiplication circuit 81 consists of multipliers corresponding to the coefficients (summation portions) on the left sides and the right side terms of the normal equations (7).

Since the matrix that is constituted of the coefficients of the prediction coefficients w on the left sides of the normal equations (7) is equal to its transpose, in the example of FIG. 12 the multipliers are provided only for the top-right portion, including the diagonal components, of the coefficient matrix and the right side terms of Equations (7).

In the above-configured multiplication circuit 81, as described above, the respective multipliers calculate products between the learning data $x_1$, $x_2$, ..., $x_m$ as subjects of the summation portions ($\Sigma$) and products of the teacher data y and the respective learning data $x_1$, $x_2$, ..., $x_m$ in the normal equations (7), and supplies the calculated products to an addition circuit 82.

Figure 13:
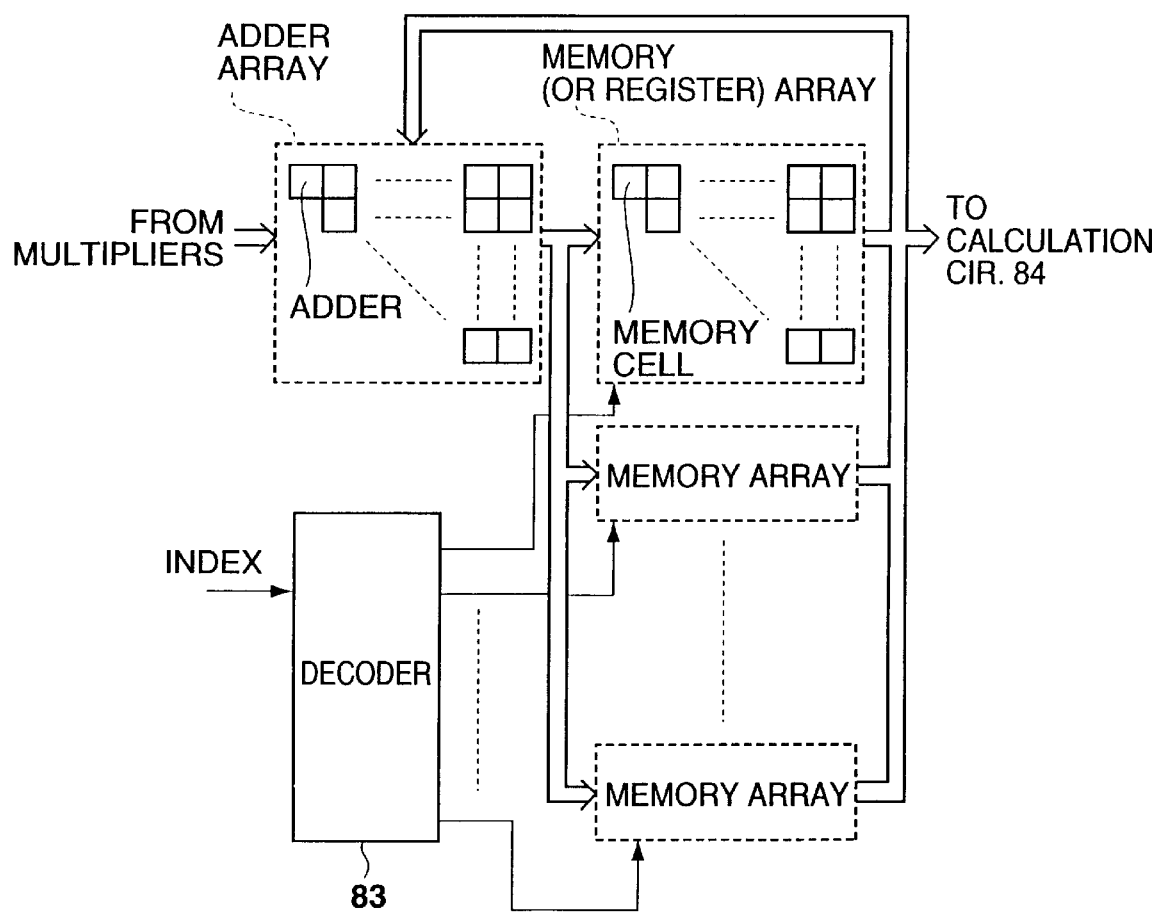
FIG. 13 is a block diagram showing an exemplary configuration of an addition circuit 62 shown in FIG. 11.

FIG. 13 shows an exemplary configuration of the addition circuit 82 shown in FIG. 11.

The addition circuit 82 includes an adder array and memory arrays (register arrays) in each of which multipliers or memory cells are arranged like the multipliers constituting the multiplication circuit 81 of FIG. 12. While the only one adder array is provided as in the case of the multiplier array of FIG. 12, the memory arrays are provided in a number corresponding to the number of classes.

In the above-configured adder circuit 82, the respective adders are supplied with outputs of the corresponding multipliers of the multiplier array, and with stored values of the corresponding memory cells of a memory array corresponding to the class that is output from a decoder 83. The respective adders add together outputs of the corresponding multipliers and memory cells, and supply addition results to the memory cells concerned. The respective memory cells store the addition results supplied from the corresponding adders. By repeating the above process, the addition circuit 82 performs the operations corresponding to the summation portions of the normal equations (7).

As a result, each of the memory arrays comes to store the coefficients of the respective terms of the normal equations (7) for the corresponding class.

The calculation circuit 84 shown in FIG. 11 calculates prediction coefficients of each class by a sweep-out method by using the stored values of the respective memory cells of the memory array corresponding to the class.

By the way, in a case where the image conversion apparatus of FIG. 2 is incorporated in a receiving apparatus for receiving an SD image according to the NTSC scheme, for instance, and prediction values of HD pixels are calculated by the first adaptive process in the prediction circuit 6, it is difficult to update the prediction coefficients in the receiving apparatus because HD pixel values as teacher data are needed for the learning as described above.

In contrast, where predictions values of HD pixels are calculated by the second adaptive process, HD pixel values as teacher data are not necessary and the learning can be performed by using only SD pixels (including decimated SD pixels). Therefore, the prediction coefficients can be updated in the receiving apparatus.

Figure 14:
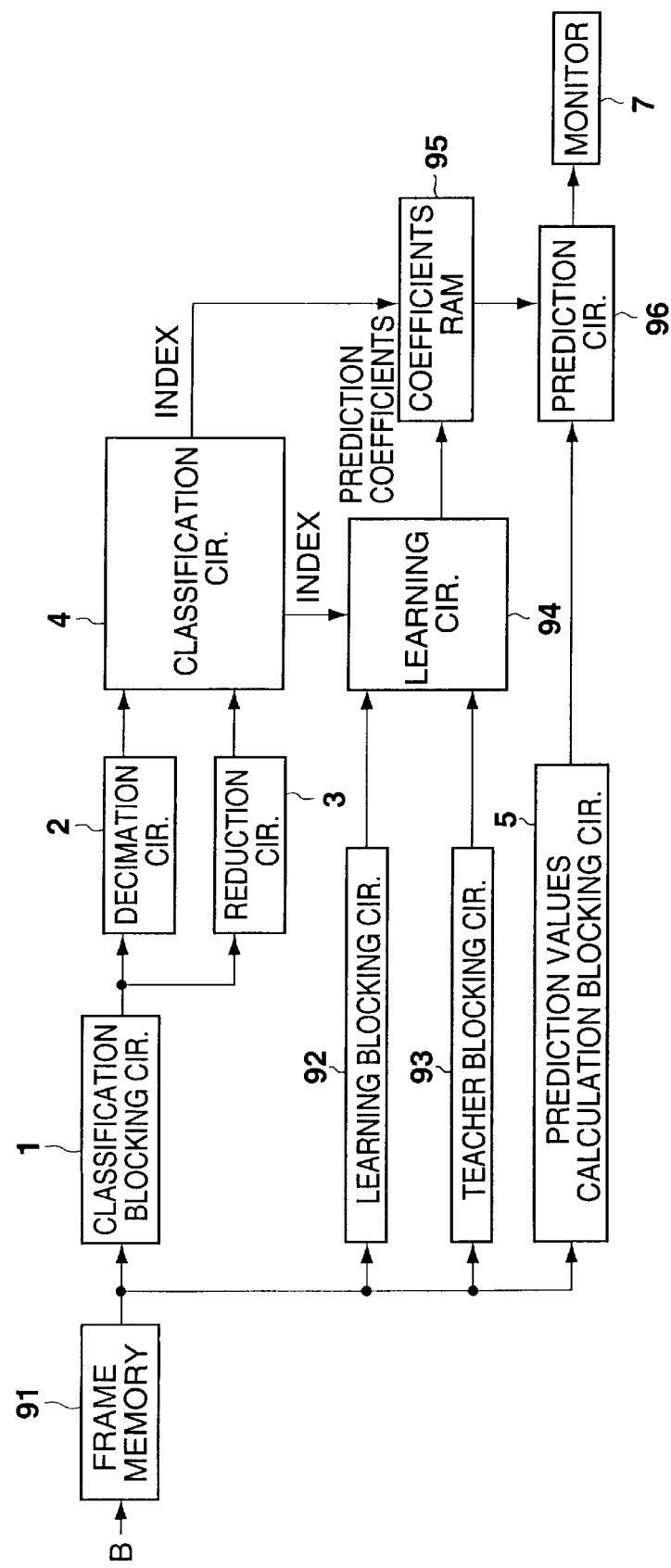
FIG. 14 is a block diagram showing a configuration of an image conversion apparatus according to a second embodiment of the invention.

FIG. 14 shows a configuration of an image conversion apparatus according to another embodiment of the invention which converts an SD image into an HD image while updating the prediction coefficients. The components in FIG. 14 corresponding to those in FIG. 2 are given the same reference numerals and descriptions therefor will be omitted where appropriate. That is, the image conversion apparatus of FIG. 14 is constructed in the same manner as that of FIG. 2 except that a frame memory 91, a learning blocking circuit 92, a teacher blocking circuit 93, a learning circuit 94, and a coefficients RAM (for example, an SRAM (static random access memory)) 95 are newly provided.

The frame memory 91 stores, on a frame-by-frame basis (or field-by-field basis), an SD image that has been transmitted via a transmission line or reproduced from a recording medium. The SD image stored in the frame memory 91 is supplied to the classification blocking circuit 1. Then, the SD image is processed in the same manner as described above in connection with FIG. 2, and the classification circuit 4 outputs an index corresponding to a class of a learning block that is output from the learning blocking circuit 92 (described later).

The SD image stored in the frame memory 91 is also supplied to the learning blocking circuit 92 and the teacher blocking circuit 93.

The learning blocking circuit 92, the teacher blocking circuit 93, and the learning circuit 94 are constructed in the same manner as the learning blocking circuit 75, the teacher blocking circuit 76, and the learning circuit 77, respectively, shown in FIG. 10. The learning circuit 94 is supplied with an index from the classification circuit 4 that corresponds to the classification circuit shown in FIG. 10. Therefore, the learning circuit 94 performs the learning as described in connection with FIG. 10, and resulting prediction coefficients are supplied to the coefficient RAM 95.

The coefficients RAM 95 is supplied with not only the prediction coefficients from the learning circuit 94 but also the index from the classification circuit 4. In the coefficients RAM 95, the prediction coefficients supplied from the learning circuit 94 are stored (overwritten) at addresses corresponding to the received index.

When the above learning process has been performed with, for instance, all the pixels constituting the SD image that is stored in the frame memory 91 employed as a subject pixel, the prediction values calculation blocking circuit 5 sequentially forms prediction values calculation blocks from the SD image that is stored in the frame memory 91, and output those blocks to the prediction circuit 96.

At this time, the AD image that is stored in the frame memory 91 is again supplied to the classification blocking circuit 1. The SD image is processed in the same manner as described above and the classification circuit 4 outputs an index corresponding to a class of a prediction values calculation block that is formed by the prediction values calculation blocking circuit 5.

The index is supplied to the coefficients RAM 95 as an address, and prediction coefficients stored at the address are read out from the coefficients RAM 95 and supplied to the prediction circuit 96.

The prediction circuit 96 consists of the sum-of-products calculator 62 and the limiter 63 that constitute the prediction circuit 6 shown in FIG. 9 (the coefficients ROM 61 is not included). The prediction circuit 96 calculates prediction coefficients of HD pixels in the manner described above in connection with Equations (8) by using the prediction coefficients that are supplied from the coefficients RAM 95.

As described above, prediction coefficients are determined from an SD image that is to be converted into an HD image and the SD image is converted into an HD image by using the prediction coefficients thus determined. In this case, a more accurate HD image can be obtained.

Although the above embodiments are directed to the case of converting an SD image into an HD image, the invention is not limited such a case and may be applied to other cases, for instance, a case of performing enlargement of an image.

In the above embodiments, prediction coefficients are stored in the coefficients ROM 61 shown in FIG. 9 (or the coefficients RAM 95 shown in FIG. 14) at addresses corresponding to each class. It is possible to store other data in the coefficients ROM 61, such as an average of pixel values of pixels that constitute a teacher block. In this case, when receiving an index for a class, the coefficients ROM 61 outputs pixel values corresponding to the class, allowing elimination of the prediction values calculation block 5 and the prediction circuit 6 (or 96 ).

Although in the above embodiments the final class is determined based on both of the first and second class information, it is possible to determine the final class based on one of the first and second class information.

Although in the above embodiments a decimated block is formed by the decimation circuit by simply decimating pixels, a decimated block may be formed by other methods such as assigning, for instance, an average of several pixels to one pixel.

Although in the above embodiments the shape of each of several kinds of blocks is made a square, the block shape is not limited to a square. The term "block" as used in this specification means a set of a certain number of pixels and it may have arbitrary shapes such as a rectangle, a cross, and a circle in addition to a square.

Further, the invention can be implemented by either hardware or software.

As described above, in the image processing apparatus and method according to the invention, self-similarity of an image is calculated based on a compressed image and a class of the image is determined based on the self-similarity. Therefore, it becomes possible to process an image more properly in accordance with its properties.

What is claimed is:

1. An image processing apparatus for classifying an image into a plurality of classes in accordance with a property thereof and for executing processes corresponding to the respective classes, comprising:

generating means for generating, from the image, a compressed image having a smaller number of pixels than the image, wherein the generating means generates, as the compressed image, a decimated image obtained by decimating pixels of the image and a reduced image obtained by eliminating peripheral pixels of the image;

calculating means for calculating self-similarity of the image based on the compressed image, wherein the calculating means comprises:

first extracting means for extracting pixels that constitute the decimated image and arranged in a given direction;

second extracting means for extracting pixels that constitute the reduced image and arranged in the given direction; and operating means for calculating, as the self-similarity in the given direction, a norm of vectors having, as components, pixel values of the pixels extracted by the first and second extracting means, respectively;

classifying means for determining a class of the image from among the plurality of classes based on the calculated self-similarity; and processing means for executing a process corresponding to the determined class on the image.

2. An image processing apparatus for classifying an image into a plurality of classes in accordance with a property thereof and for executing processes corresponding to the respective classes, comprising:

generating means for generating, from the image, a compressed image having a smaller number of pixels than the image, wherein the generating means generates, as the compressed image, a decimated image obtained by decimating pixels of the image and a reduced image obtained by eliminating peripheral pixels of the image;

calculating means for calculating self-similarity of the image based on the compressed image, wherein the calculating means calculates pixel values of pixels constituting the decimated image by extrapolating pixel values of pixels constituting the reduced image and calculates an error of an extrapolation result as the self-similarity of the image;

classifying means for determining a class of the image from among the plurality of classes based on the calculated self-similarity; and processing means for executing a process corresponding to the determined class on the image.

3. An image processing apparatus for classifying an image into a plurality of classes in accordance with a property thereof and for executing processes corresponding to the respective classes, comprising:

generating means for generating, from the image, a compressed image having a smaller number of pixels than the image, wherein the generating means generates, as the compressed image, a decimated image obtained by decimating pixels of the image and a reduced image obtained by eliminating peripheral pixels of the image;

calculating means for calculating self-similarity of the image based on the compressed image, wherein the calculating means calculates pixel values of pixels constituting the reduced image by interpolating pixel values of pixels constituting the decimated image and calculates an error of an interpolation result as the self-similarity of the image;

classifying means for determining a class of the image from among the plurality of classes based on the calculated self-similarity; and processing means for executing a process corresponding to the determined class on the image.

4. The image processing apparatus according to claim 1, further comprising detecting means for detecting a pattern of pixel values of pixels arranged in a direction in which the self-similarity calculated by the calculating means is highest, wherein the classifying means classifies the image as a class corresponding to the detected pattern.

5. The image processing apparatus according to claim 4, wherein the classifying means classifies the image as a class corresponding to both of the self-similarity calculated by the calculating means and the detected pattern.

6. The image processing apparatus according to claim 1, wherein the processing means executes an adaptive process that determines prediction values of pixel values by linearly combining pixel values of the image and prediction coefficients corresponding to the class of the image.

7. The image processing apparatus according to claim 6, wherein the prediction coefficients are ones obtained by performing learning so as to allow the prediction values of given pixels of the image to be calculated based on pixel values of pixels constituting a given block, and wherein the processing means executes the adaptive process on a block smaller than the given block by using the calculated prediction coefficients.

8. The image processing apparatus according to claim 2, further comprising detecting means for detecting a pattern of pixel values of pixels arranged in a direction in which the self-similarity calculated by the calculating means is highest, wherein the classifying means classifies the image as a class corresponding to the detected pattern.

9. The image processing apparatus according to claim 8, wherein the classifying means classifies the image as a class corresponding to both of the self-similarity calculated by the calculating means and the detected pattern.

10. The image processing apparatus according to claim 2, wherein the processing means executes an adaptive process that determines prediction values of pixel values by linearly combining pixel values of the image and prediction coefficients corresponding to the class of the image.

11. The image processing apparatus according to claim 10, wherein the prediction coefficients are obtained by a learning operation so as to allow the prediction values of given pixels of the image to be calculated based on pixel values of pixels constituting a given block, and wherein the processing means executes the adaptive process on a block smaller than the given block by using the calculated prediction coefficients.

12. The image processing apparatus according to claim 3, further comprising detecting means for detecting a pattern of pixel values of pixels arranged in a direction in which the self-similarity calculated by the calculating means is highest, wherein the classifying means classifies the image as a class corresponding to the detected pattern.

13. The image processing apparatus according to claim 12, wherein the classifying means classifies the image as a class corresponding to both of the self-similarity calculated by the calculating means and the detected pattern.

14. The image processing apparatus according to claim 3, wherein the processing means executes an adaptive process that determines prediction values of pixel values by linearly combining pixel values of the image and prediction coefficients corresponding to the class of the image.

15. The image processing apparatus according to claim 14, wherein the prediction coefficients are obtained by a learning operation so as to allow the prediction values of given pixels of the image to be calculated based on pixel values of pixels constituting a given block, and wherein the processing means executes the adaptive process on a block smaller than the given block by using the calculated prediction coefficients.

16. An image processing method for classifying an image into a plurality of classes in accordance with a property thereof and for executing processes corresponding to the respective classes, comprising the steps of:

generating, from the image, a compressed image having a smaller number of pixels than the image by generating, as the compressed image, a decimated image obtained by decimating pixels of the image and a reduced image obtained by eliminating peripheral pixels of the image;

calculating self-similarity of the image based on the compressed image by, extracting pixels that constitute the decimated image and arranged in a given direction;

extracting pixels that constitute the reduced image and arranged in the given direction; and calculating, as the self-similarity in the given direction, a norm of vectors having, as components, pixel values of the pixels extracted by the extracting steps, respectively;

determining a class of the image from among the plurality of classes based on the calculated self-similarity; and executing a process corresponding to the determined class on the image.

17. An image processing method for classifying an image into a plurality of classes in accordance with a property thereof and for executing processes correspondence to the respective classes, comprising the steps of:

generating, from the image, a compressed image having a smaller number of pixels than the image by generating, as the compressed image, a decimated image obtained by decimating pixels of the image and a reduced image obtained by eliminating peripheral pixels of the image;

calculating self-similarity of the image based on the compressed image by calculating pixel values of pixels constituting the decimated image by extrapolating pixel values of pixels constituting the reduced image and by calculating an error of an extrapolation result as the self-similarity of the image;

determining a class of the image from among the plurality of classes based on the calculated self-similarity; and executing a process corresponding to the determined class on the image.

* * * * *